United States Patent
Fritzboeger (10) Patent No.: US 9,986,729 B2
(45) Date of Patent: Jun. 5, 2018

(54) TRAP FOR RODENTS

(75) Inventor: Preben Fritzboeger, Helsinge (DK)

(73) Assignee: ANTICIMEX INNOVATION CENTER A/S, Helsinge (DK)

( * ) Notice: Subject to any disclaimer, the term of this patent is extended or adjusted under 35 U.S.C. 154(b) by 344 days.

(21) Appl. No.: 14/111,147

(22) PCT Filed: Apr. 10, 2012

(86) PCT No.: PCT/DK2012/050118
§ 371 (c)(1),
(2), (4) Date: Jan. 21, 2014

(87) PCT Pub. No.: WO2012/139585
PCT Pub. Date: Oct. 18, 2012

(65) Prior Publication Data
US 2014/0173969 A1    Jun. 26, 2014

Related U.S. Application Data

(60) Provisional application No. 61/475,529, filed on Apr. 14, 2011.

(30) Foreign Application Priority Data

Apr. 11, 2011  (DK) .................................. 2011 70170

(51) Int. Cl.
*A01M 23/38* (2006.01)
*A01M 23/12* (2006.01)

(52) U.S. Cl.
CPC ............ *A01M 23/38* (2013.01); *A01M 23/12* (2013.01)

(58) Field of Classification Search
CPC ...... A01M 23/38; A01M 23/00; A01M 23/02; A01M 23/12; A01M 23/14; A01M 19/00
(Continued)

(56) References Cited

U.S. PATENT DOCUMENTS 2,360,651 A * 10/1944 Crumrine .............. A01M 23/38
                                                          250/215
2,437,507 A *  3/1948 Crumrine .............. A01M 23/38
                                                           43/61
(Continued)

FOREIGN PATENT DOCUMENTS

DE    102007055581 A1    5/2009
GB         187382 A     10/1922
(Continued)

OTHER PUBLICATIONS

Danish Search Report for PA 2011 70170, Search completed Nov. 22, 2011.
(Continued)

*Primary Examiner* — Darren W Ark
*Assistant Examiner* — Danielle A Clerkley
(74) *Attorney, Agent, or Firm* — Brinks Gilson & Lione (57) ABSTRACT

1. A trap for rodents, including in particular rats, said trap comprising: a housing; and a trapping chamber in which a passage extends from the side(s) of the housing. The trap further comprises two electric poles, of which the one electric pole is disposed outside the trapping chamber and a reservoir. The trap is moreover configured with a transport mechanism for the transport of the trapping chamber with rodent between a lower position in which the rodent is able to run into the trapping chamber and an upper position in which the trapping chamber is able to discharge a destroyed rodent into the reservoir. The trapping chamber and the electric poles comprise means to the effect that the electric poles can be caused to be situated close to each other within the trapping chamber.

20 Claims, 8 Drawing Sheets

(58) Field of Classification Search
USPC .............................. 43/61, 98, 99, 64, 73, 76
See application file for complete search history.

(56) References Cited

U.S. PATENT DOCUMENTS

| | | | | |
|---|---|---|---|---|
| 2,448,780 A | * | 9/1948 | Crumrine | .............. A01M 23/14 43/61 |
| 2,515,947 A | * | 7/1950 | Crumrine | .............. A01M 23/18 43/77 |
| 3,815,278 A | | 6/1974 | Beaton et al. | |
| 4,138,796 A | * | 2/1979 | Souza | .................. A01M 23/14 43/61 |
| 4,205,480 A | | 6/1980 | Gartner | |
| 5,369,907 A | | 12/1994 | Lee | |
| 5,918,409 A | | 7/1999 | Carnwath | |
| 5,953,853 A | | 9/1999 | Kim | |
| 2010/0146839 A1 | | 6/2010 | Cruz et al. | |

FOREIGN PATENT DOCUMENTS

| | | |
|---|---|---|
| JP | S48001152 B | 1/1973 |
| JP | S50121064 A | 9/1975 |
| JP | S5420886 A | 5/1982 |
| JP | S5783241 A | 5/1982 |
| RU | 2322806 | 4/2008 |
| RU | 95224 U1 | 6/2010 |

OTHER PUBLICATIONS

International Search Report for PCT/DK2012/050118, dated Jun. 21, 2012.
Written Opinion of the International Search Authority for PCT/DK2012/050118, dated Jun. 21, 2012.
Office Action for Canadian Application No. 2,832,455, dated Mar. 14, 2018.

* cited by examiner

TRAP FOR RODENTS

RELATED APPLICATIONS

This application claims the benefit under 35 U.S.C. § 371 of International Patent Application No. PCT/DK2012/050118, having an international filing date of Apr. 10, 2012, which claims priority to Danish Patent Application No. PA 2011 70170, filed Apr. 11, 2011, and U.S. Provisional Application No. 61/475,529, filed Apr. 14, 2011, the contents of all of which are incorporated herein by reference in their entirety.

The invention relates to a trap for rodents, including in particular rats, said trap comprising: a housing; a trapping chamber wherein a passage extends from the side(s) of the housing; two electric poles of which the one electric pole is disposed outside the trapping chamber; a reservoir.

Known rat traps for being disposed on the surface of the ground typically comprise some kind of clap mechanism which, in the course of nature, is capable of killing one rodent, such as eg a rat or a mouse, following which the trap needs to be emptied. Other types of traps function in accordance with a "bait trap" principle where the animal is lured into the trap. Such type is described in British patent No. GB 187382 A.

The drawbacks of those prior art types of traps are that they need to be inspected at short intervals since the trap is either released or contains live animals.

Those drawbacks are overcome by the housing comprising a transport mechanism for the transport of the trapping chamber with rodent between a lower position in which the rodent is able to run into the trapping chamber and an upper position in which the trapping chamber is able to discharge a destroyed animal into the reservoir, and in that the trapping chamber and the electric poles comprise means to the effect that the electric poles can be caused to be situated so close to each other within the trapping chamber that they are capable of destroying a rodent present between the poles.

Embodiments of the invention are set forth in the subclaims.

In the specification and claims, the phrasing that the electric poles comprise means to the effect that the electric poles can be caused to be situated close to each other inside the trapping chamber is used, which phrasing is not necessarily intended to imply physical contact; rather it is intended that the electrical poles can, from a purely functional point of view, be brought to be so close to each other that they are capable of destroying a rodent present between the poles.

In the following, an embodiment of the invention will be explained with reference to the figures, wherein.

Figure 1:
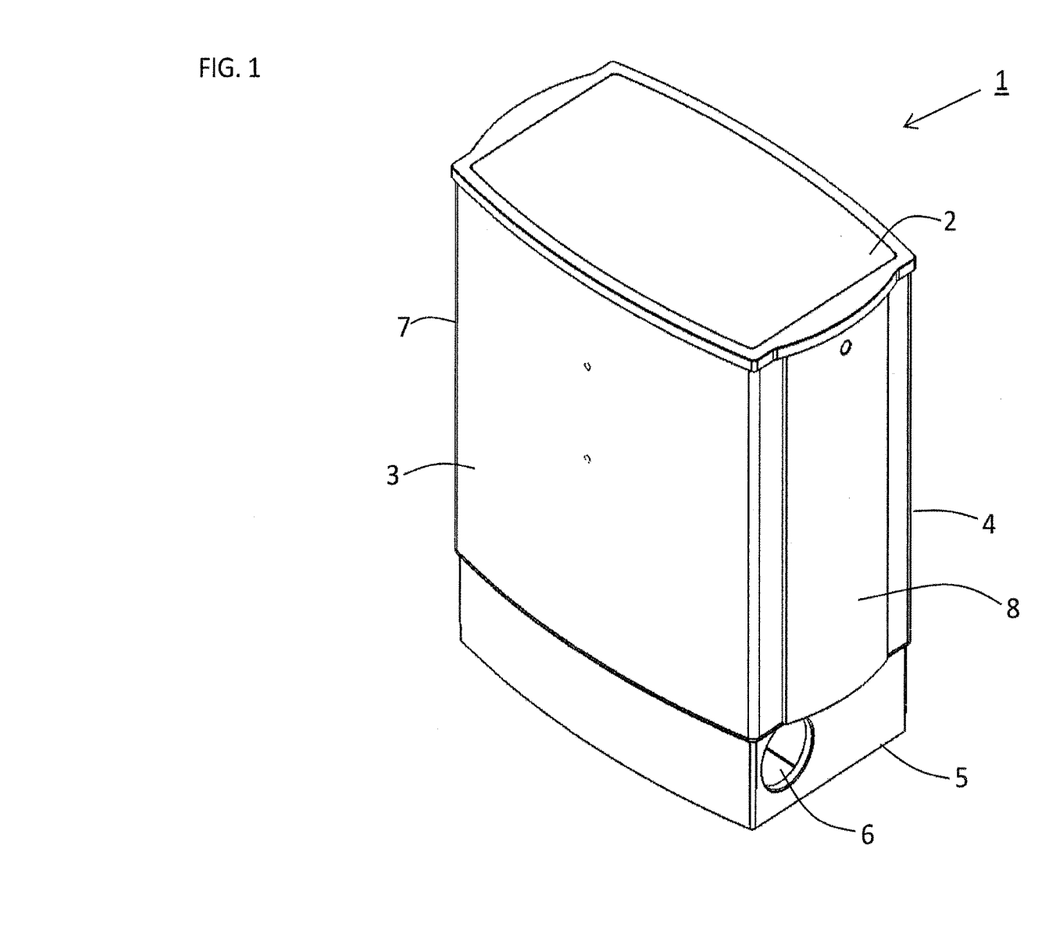
FIG. 1 is a perspective view of an embodiment of a housing according to the invention.

FIG. 1 shows an embodiment of a trap for rodents. The trap comprises a housing 1 and moreover a top plate 2, a bottom plate 5 and four sides. In the shown embodiment they are dismountable. In the lowermost left corner of the trap, one can see an entry/exit hole 6 for a passage extending through the housing. The part traversed by the passage is also designated the trapping chamber 10.

Figure 2:
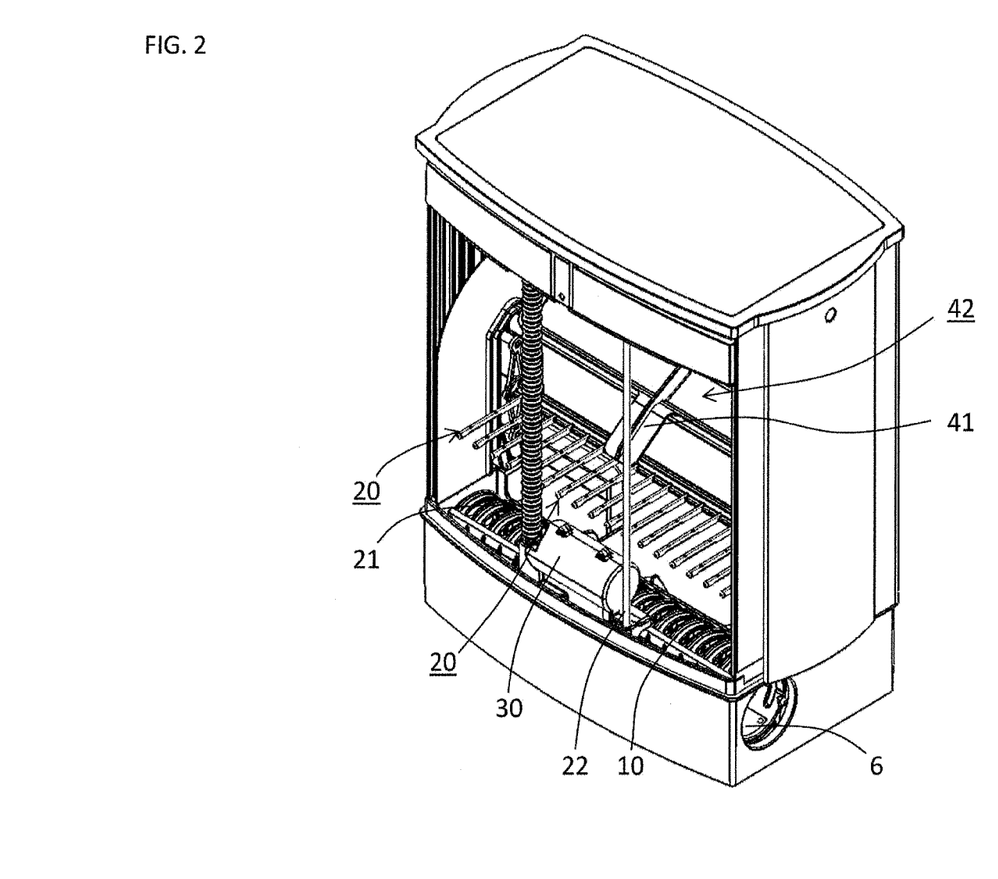
FIG. 2 shows a sectional view of an embodiment of the trap, seen from the front, and where a side panel has been omitted.

FIG. 2 is a schematic view showing a section of the trap, seen from the front, and here the dismountable panel has been omitted. This figure shows the trapping chamber 10 which the rodent enters when it runs through the opening 6.

Thus, in the shown embodiment, the trapping chamber constitutes a passage that extends from the opening 6 and to an opening (not shown) at the other side of the housing.

Of course, the passage may also be configured so as not to extend to another opening in the housing, but is merely closed at the other end.

Moreover, the trap comprises two electric poles. The one is seen above the trapping chamber and, in the shown embodiment, it is constituted by a rake 20 comprising a row of teeth.

Figure 3:
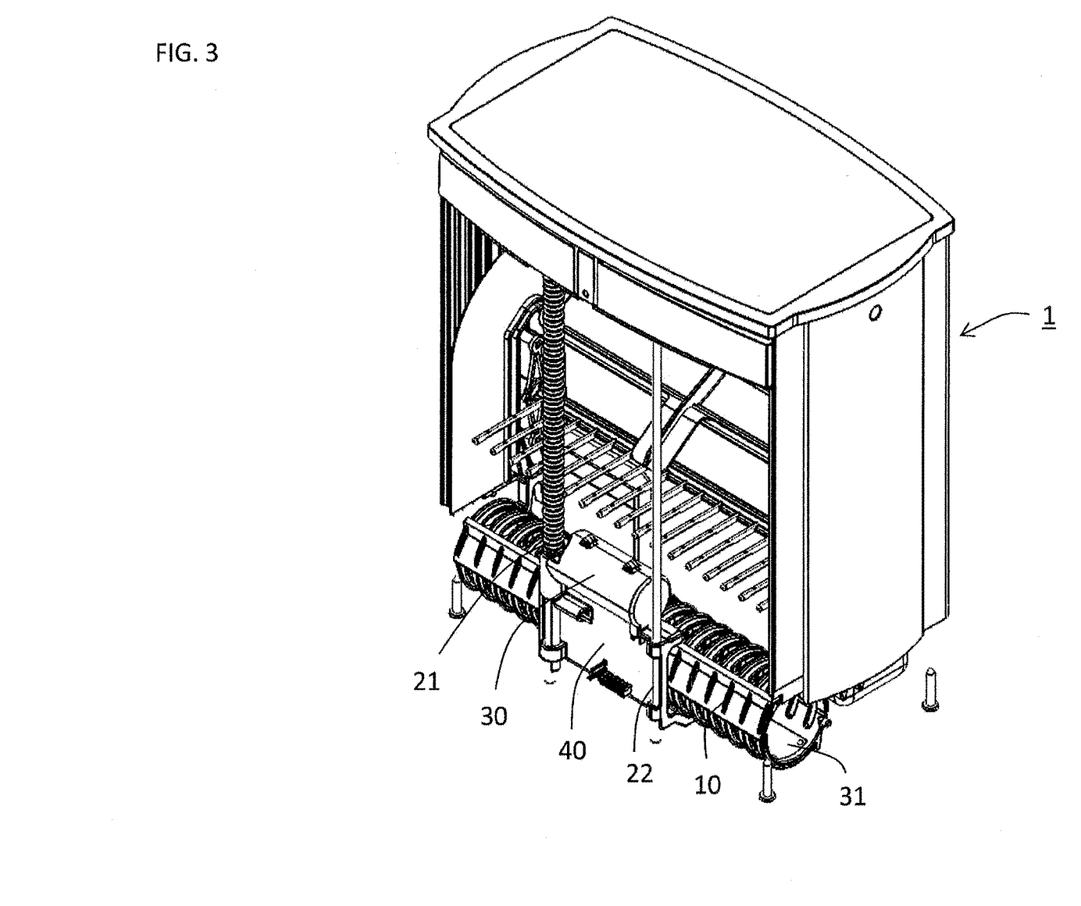
FIG. 3 shows a sectional view of an embodiment of the trap, seen from the front, and where a side panel and bottom panel have been omitted.

The second pole is shown in FIG. 3 which will be subject to discussion below.

Behind the rake, a reservoir is shown which, in the embodiment shown, is constituted by a bucket-like container 42 with a lid provided with handle 41.

FIG. 3 shows the trap 1, where the lowermost panel has also been omitted; as will appear, the motor part is, via a plate part 40, mounted partly on a guide 22 and partly on a rack 21. By means of motor, rack, and guide the trapping chamber can be caused to be disposed between the lower position it occupies in FIG. 1 and an upper position in which the trapping chamber is capable of discharging contents, if any, into the reservoir/the bucket 42.

Behind the plate 40, a sensor (not shown) is mounted which is, capable of detecting the presence of a rodent/rat in the trapping chamber. That sensor may be an infrared sensor, but other types of movement sensors may of course be employed, and the sensor may also be based on a purely mechanical principle.

At the bottom of the trapping chamber, one may observe how the trapping chamber is provided with a plate 31. The plate extends throughout the entire expanse of the trapping chamber and in the bottom of same.

That plate serves as the second electric pole.

Usually, the plate 31 is of such size that a rodent present in the trapping chamber will be on the plate 31 no matter where in the trapping chamber it is.

Figure 4:
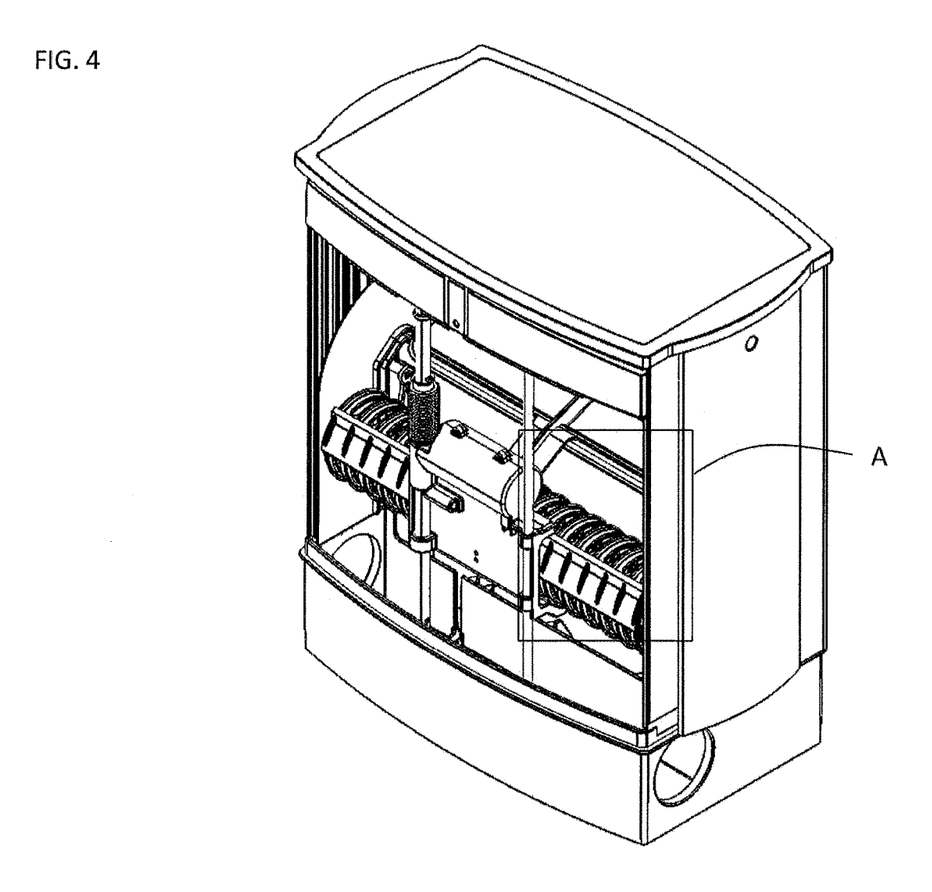
FIG. 4 shows a sectional view of an embodiment of the trap, seen from the front, and where a side panel is omitted, wherein the trapping chamber of the trap is located between an upper discharge position and a lower trapping position.
Figure 5:
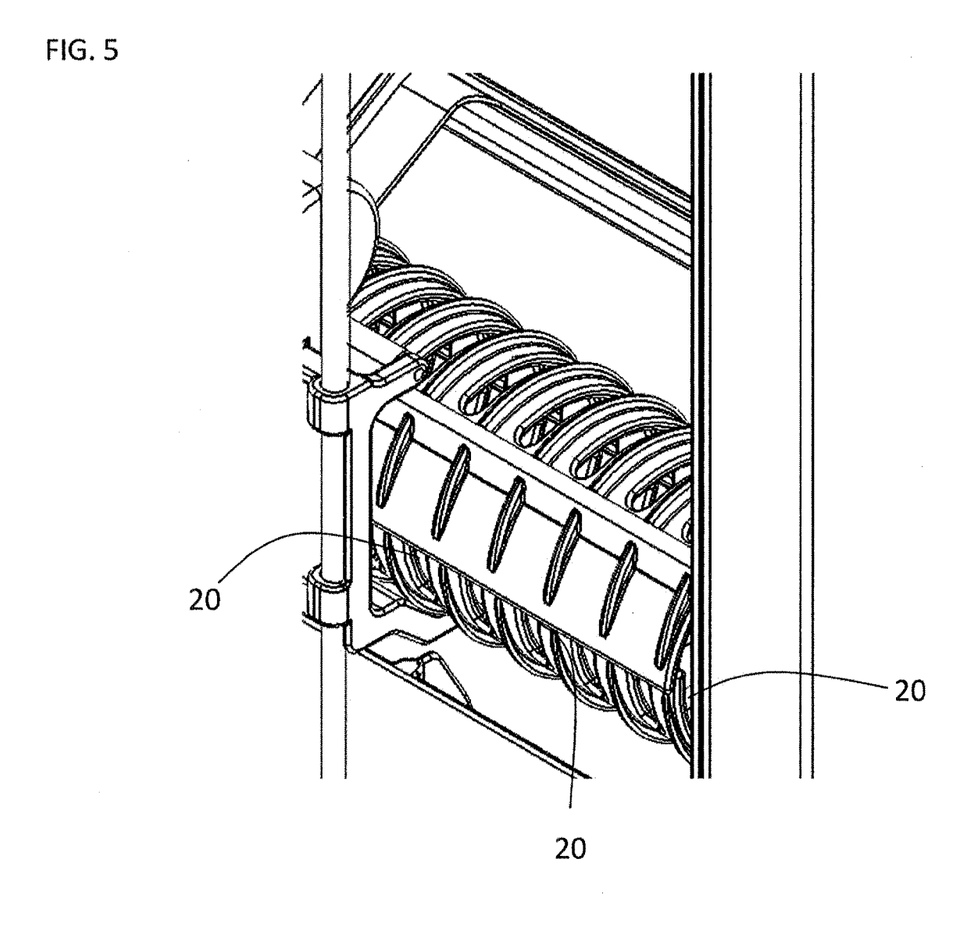
FIG. 5 is an enlarged view of section a of FIG. 4.

FIG. 4 shows the trap wherein the trapping chamber has been moved to a position in which its open ends are covered by the sides of the trap. Thus, the movement of the trapping chamber takes place when the above-mentioned sensor has detected the presence of a rodent/rat in the chamber.

The trap may be equipped with a programmable control and it is, in one embodiment, programmed such that the movement takes place in two stages, whereby a first swift upwards movement serves the purpose of raising the trapping chamber to a position in which its end openings are covered by the sides of the housing.

Thereby the rodent is trapped.

Now, the further movement serves the purpose of causing the legs of the rake to enter the trapping chamber in such a manner that a rodent present therein will come into electric contact with both plate and rake.

Of course, the first swift movement may also—in addition to capturing the rodent—serve the purpose of causing the trapping chamber to be in a position in which the rodent may be destroyed by an electric current running between the poles via the rodent/the rat.

Figure 6:
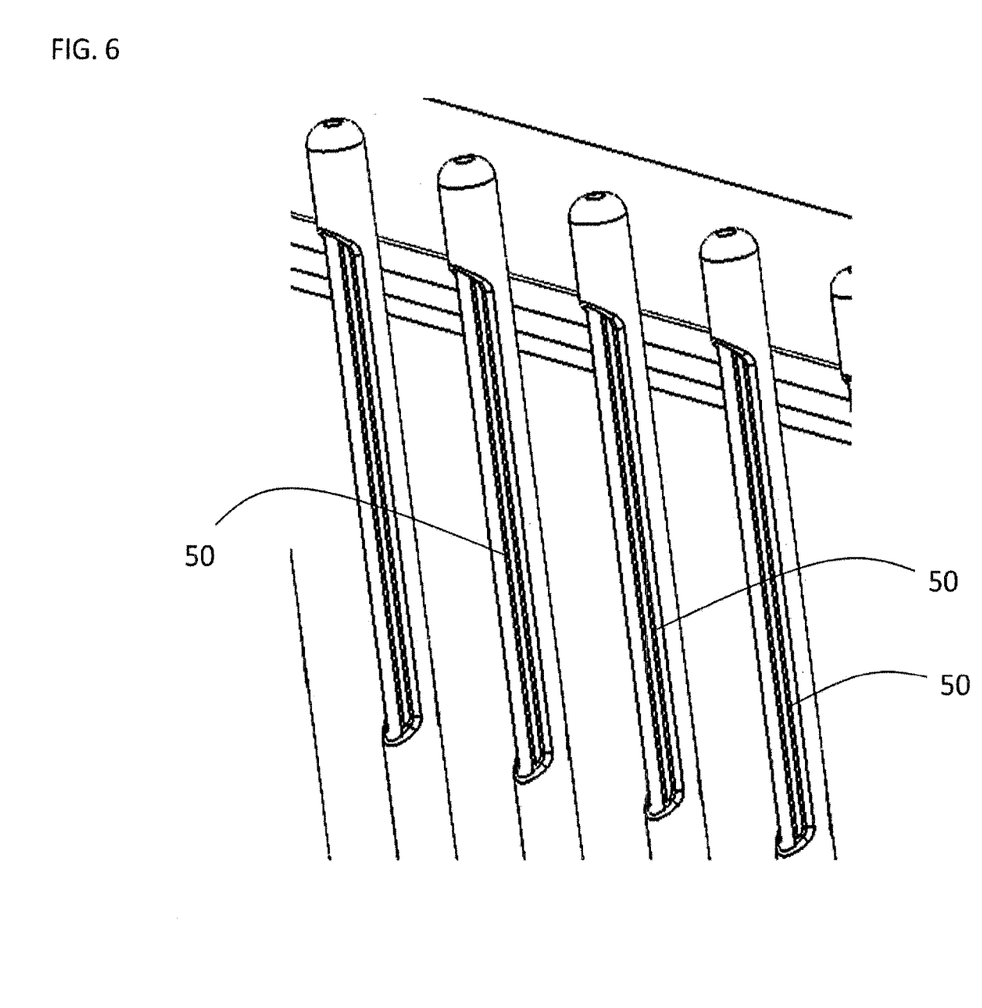
FIG. 6 shows some of the legs of the rake, seen in an enlarged view.

FIG. 6 shows a close-up/an enlargement of some of the teeth of the rake (section b in FIG. 8), and here it will appear that, on their underside, they are provided with a cut-out exposing a plate part 50 which is current-carrying.

In the shown embodiment, the destruction as such of the rodent takes place by it being exposed to current running through the rake and out through said plate parts mentioned above and on through the rodent to the plate located at the bottom of the trapping chamber.

Figure 7:
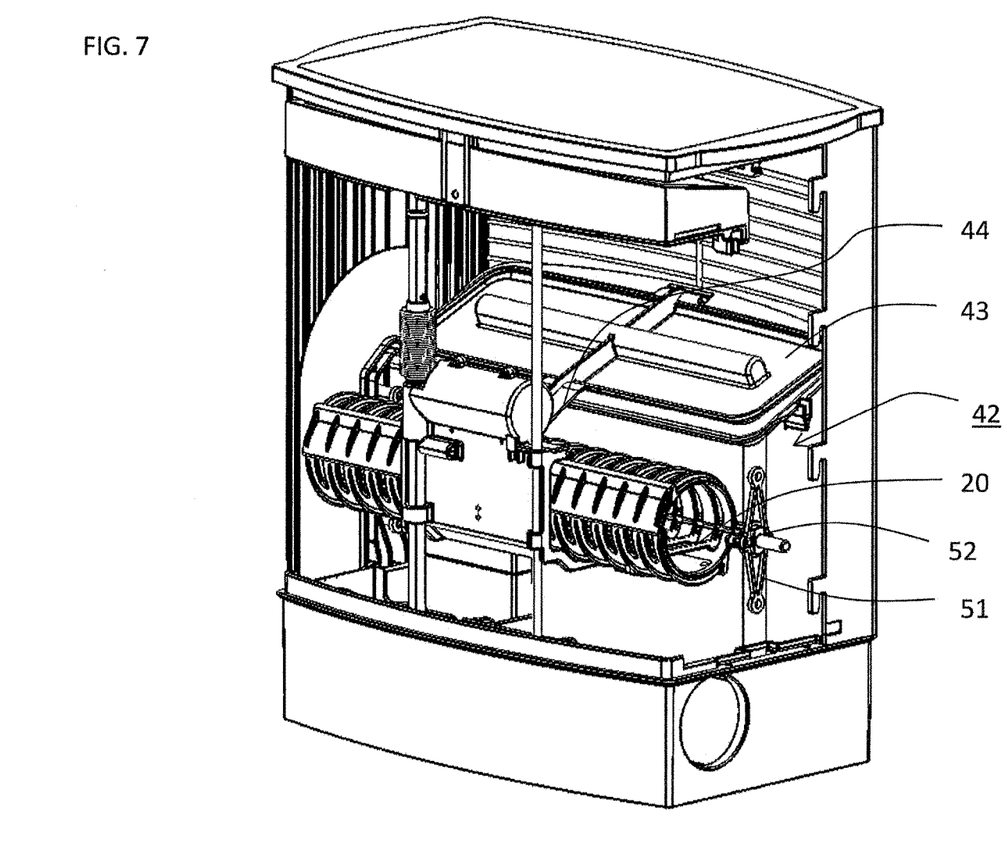
FIG. 7 shows a sectional view of an embodiment of the trap, where one more side panel has been omitted—for illustrative purposes—to enable observation of how the one pole has entered the trapping chamber.

FIG. 7 shows the interior of the trap, where the trapping chamber has been raised to a position in which the rake has penetrated there into. In the right side of the rake, an elastic member 51 is shown which is tensioned around the shaft on which the rake 20 is situated. At the other end of the rake, an elastic member is positioned in a similar manner. By that arrangement it is enabled that the rake will seek towards its horizontal position since the elastic members are stretched when the rake rotates (about the shaft) away from that position.

Figure 8:
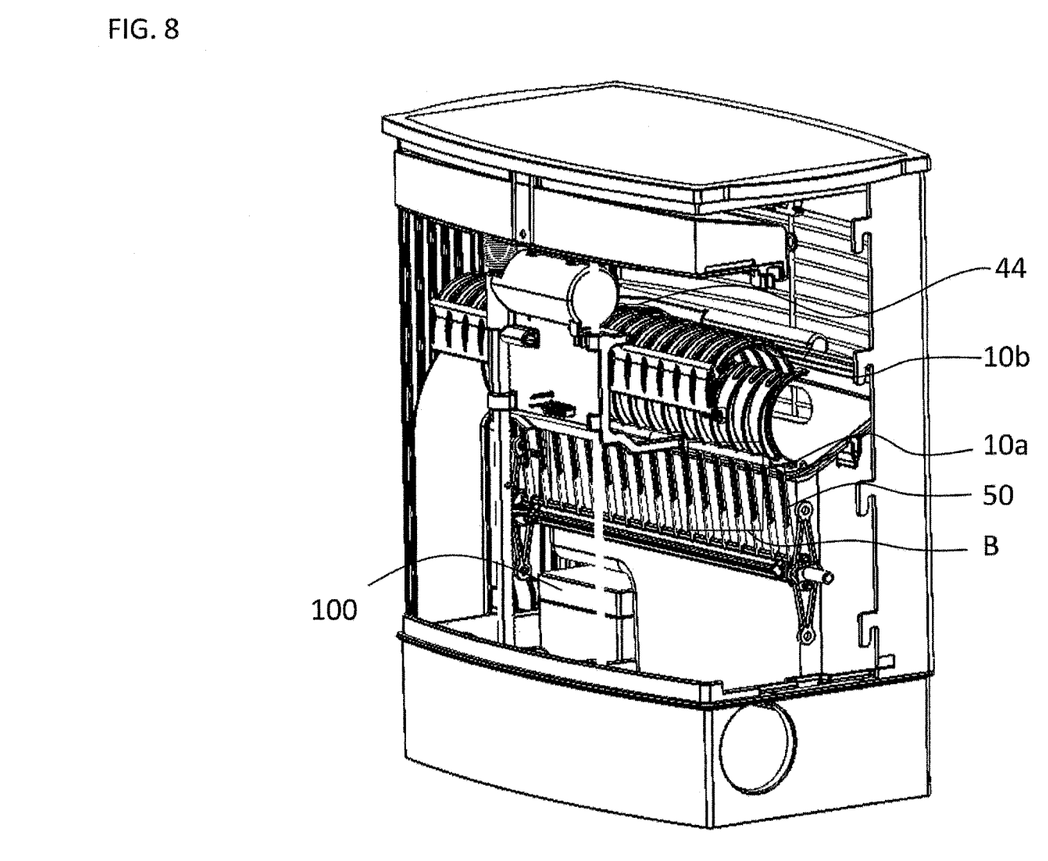
FIG. 8 shows a sectional view of the trap, where one more side panels has/have been omitted—for illustrative purposes—to enable observation of how the trapping chamber is emptied when it is in its upper position.

This will appear more clearly from FIG. 8.

On the one hand, it is the purpose of the tiltable rake that its legs should be capable of following the trapping chamber when the latter is moved upwards or downwards and, on the other hand, to arrive at a trap wherein the position of a current-carrying part adapts to the size of a trapped animal. Thereby a high degree of reliability is obtained that the current-carrying parts 50 of the rake are caused to be in good electric contact with the animal irrespective of any variation in size they may exhibit. To the rear of the trap, a reservoir is shown which—in the shown embodiment—is constituted by a container 42 with lid 43 on which a handle 44 is arranged.

In FIG. 8 the trap is shown with the trapping chamber raised to an upper position where it discharges its contents into the posteriorly located bucket. As will appear here, the trapping chamber consists of two parts: an upper part 10b and a lower part 10a that have separated in such a manner that the lid of the bucket has been lifted by the upper part of the trapping chamber, while simultaneously the lower part of the trapping chamber has been moved to a position in which its contents can/will be discharged into the bucket.

As will also appear from FIG. 8, the construction of the trap with tiltable rake enables movement of the pipe past the rake; this is of significance when the trap is to be emptied, as the rake would otherwise have blocked such movement.

The lower part of the trapping chamber is controlled—as mentioned above—by a guide whereby the lowermost part is, during upward movement, tilted and hence discharges the rodent into the associated reservoir.

The trapping chamber as such is safeguarded against unintentional release of a rodent in that: upper part 10b and lower part 10a are adapted geometrically to each other to the effect that the upper part 10b cannot be tilted until the lower part has been moved towards the discharge position.

The two parts are conveyed apart by means of guides in the trap, and when, following a period of time, the motor moves in the other direction, the trapping chamber will move towards its lower position while simultaneously closing.

Now, the trap is ready for renewed use.

By the invention, it has been found that it is possible to make a trap functioning by means of current and which safeguards to a high degree that one will not get an electric chock there from. It is a safety aspect that the trapping chamber comprises the one (or more) electrode(s), and that that the other (one or more) electrode(s) is (are) arranged at a distance there from By that constellation, it is thus obtained that eg a child's hand—which is inserted into the trapping chamber via the opening in the side of the trap—is unable to touch both electrodes at one and the same time. Albeit, of course, the trap can also be configured such that the electrode/rake is moved towards the trapping chamber, it is usually associated with a higher degree of safety to allow the reverse to happen.

The reason for this is that there is also a safety aspect to the end openings of the trapping chamber being covered by the side plates of the trap when it is raised to the rake. Thereby the trapping chamber cannot be moved as long as something (eg an arm, a cat's paw, or the like) protrudes through one of the end openings of the trapping chamber.

Another safety aspect resides in the configuration of the rake as such, it being—except in areas that will come into contact with the rodent—configured with current-insulating coatings. This will appear from FIG. 6, and, as it will also appear, those areas are the lowermost part of the rake's legs.

To prevent a rodent from blocking the upwards or downwards movement of the trapping chamber, the trap may be configured with a smooth coating on the inside (in the areas that the end openings travel past during upwards/downwards movement.

The electric current used is usually about 6,000 Volts that are applied for a period of about two minutes, but, of course, that may also be varied as needed.

Another safety aspect of the trap is that, apart from the above-mentioned infrared sensor, the trap can also be equipped with an actual light sensor which is capable of detecting daylight. In that embodiment, the trap will quite simply be left to be inactive in daylight and not activate itself until the light sensor no longer detects visible light. An advantage of that feature is also that artificial light—coming eg from a lamp can/will also deactivate the trap.

In a trap equipped with a light sensor, the electronic equipment usually makes it possible to choose to either switch on or switch off that feature.

In the lower rearmost left corner of the trap, the power supply 100 of the trap will appear which, in the shown embodiment, is a battery, but, of course, other power supply units may also be used, including the mains supply.

Since the trap is to be used at the ground surface, it may also be provided with solar cells.

In the shown embodiment, a bucket is arranged in the reservoir chamber, in which a bag can be arranged in entirely the same manner as in a common waste bin stand for kitchen cupboards. Thus, the trap can be used continuously for destroying several rodents without a need for it to be "charged" or emptied in between.

By configuring the trap with suitable electronic equipment, the number of "kills" can be registered, and, as it is, the trap may even be equipped with means to the effect that it may, via eg the mobile internet and/or the internet, report its operating state, including battery state, error, or need to be emptied.

According to one embodiment, the trap is provided with housing and associated parts, including trapping chamber, made of plastics.

The electrically conductive parts are usually made of metal, but they can also—depending on relevant needs—be made of electrically conductive plastics. Configuration of the electrically conductive parts in plastics provides an easier production, the methodologies of plastics production—including extrusion—being suitable for use for both the electric parts and other parts of the trap.

The invention claimed is:

1. A trap for rodents, including in particular rats, said trap comprising:
   a housing;
   a trapping chamber in which a passage extends between first and second sides of the housing, wherein the trapping chamber includes an upper part and a lower part;
   two or more electric poles, of which one or more first electric poles are disposed outside the trapping chamber;
   a reservoir; and
   a transport mechanism configured to move the upper part and the lower part of the trapping chamber in unison from a lower position at which the rodent is able to enter the trapping chamber to an upper position,
   wherein when the trapping chamber is at the upper position, the trapping chamber is configured to discharge a destroyed rodent into the reservoir, and
   wherein during movement of the trapping chamber from the lower position to the upper position, the trapping chamber and the electric poles come in proximity to one another to facilitate destruction of a rodent present between the poles.

2. The trap for rodents according to claim 1, wherein a second electrical pole of the two or more electric poles different from the one or more first electric poles is configured to remain stationary inside the trapping chamber as the trapping chamber moves between the lower position and the upper position.

3. The trap for rodents according to claim 2, wherein the second electric pole corresponds to a plate part in the bottom of the trapping chamber.

4. The trap for rodents according to claim 2, wherein the trapping chamber and the one or more first electric poles are caused to move towards each other in such a manner that a rodent present in the trapping chamber will be caused to be in contact with the one or more first poles and the second electric pole.

5. The trap for rodents according to claim 1, wherein the one or more first electric poles are configured to penetrate the trapping chamber.

6. The trap for rodents according to claim 1, wherein the one or more first electric poles correspond to one or more legs of a rake configured to penetrate through complementary slots configured in the trapping chamber.

7. The trap for rodents according to claim 1, wherein the upper part and the lower part slide apart.

8. The trap for rodents according to claim 7, wherein the upper part and the lower part are locked together and are configured to remain locked together until the trapping chamber is in the upper position.

9. The trap for rodents according to claim 1, wherein the reservoir comprises a bag for collecting destroyed rodents.

10. The trap for rodents according to claim 1, wherein the one or more first electric poles correspond to a rake that can be tilted.

11. The A trap for rodents according to claim 1, wherein the passage extends between openings in opposing sides of the housing.

12. The trap for rodents according to claim 1, wherein the trapping chamber is, in its lower position, arranged such that a rodent will travel through the trapping chamber, when it traverses the passage.

13. The trap for rodents according to claim 11, wherein the trapping chamber and the housing of the trap are adapted such to each other that the openings of the trapping chamber are covered by the sides of the housing when the trapping chamber is moved upwards.

14. The trap for rodents according to claim 1, wherein the reservoir comprises a lid which is opened when the trapping chamber is in its upper position.

15. The trap for rodents according to claim 1, wherein the reservoir comprises a lid which is configured with a handle to the effect that the lid is opened when the trapping chamber hits the handle during its movement towards the upper position.

16. The trap for rodents according to claim 2, wherein the second electric pole corresponds to a plate part in the bottom of the trapping chamber.

17. The trap for rodents according to claim 16, wherein the trapping chamber and the one or more first electric poles are caused to move towards each other in such a manner that a rodent present in the trapping chamber will be caused to be in contact with the one or more first poles and the second electric pole.

18. The trap for rodents according to claim 3, wherein the trapping chamber and the one or more first electric poles are caused to move towards each other in such a manner that a rodent present in the trapping chamber will be caused to be in contact with the one or more first poles and the second electric pole.

19. The trap for rodents according to claim 2, wherein the one or more first electric poles are configured to penetrate the trapping chamber.

20. The trap for rodents according to claim 2, wherein the one or more first electric poles correspond to one or more legs of a rake that are configured to penetrate through complementary slots configured in the trapping chamber.

* * * * *